Patented Dec. 14, 1948

2,456,210

UNITED STATES PATENT OFFICE 2,456,210

UNSATURATED ESTERS OF BENZENEDIACETIC ACIDS AND THEIR POLYMERS

Henry C. Miller, Claymont, Del., assignor to E. I. du Pont de Nemours & Company, Wilmington, Del., a corporation of Delaware No Drawing. Application August 1, 1946,
Serial No. 687,715

19 Claims. (Cl. 260—78.4)

1

This invention relates to a new class of unsaturated esters, to polymers thereof and to coatings and coating compositions containing such polymers. More particularly this invention relates to a new class of esters derived from unsaturated alcohols and dibasic acids and to polymers thereof having unique properties as coating compositions.

Polymers of esters derived from unsaturated alcohols and polybasic acids, such as diallyl phthalate, dimethallyl succinate, and diallyl adipate, have heretofore been used as coating compositions, for cast articles, and for the impregnation of fibrous materials. These polymers can be highly crosslinked to insoluble, infusible coatings which do not soften at high temperatures and which are inert towards solvents, such as aromatic hydrocarbons. Although some of these polymers give coatings which are pliable as well as inert toward organic solvents, all such pliable coatings have heretofore been sensitive towards water and especially sensitive towards aqueous alkali or strong soap solution. Moreover, those polymers which give films of good alkali and water resistance are too brittle for many important applications. Thus polymers of esters derived from unsaturated alcohols and polybasic acids heretofore have been unsuitable for many industrial applications because they were either too brittle or too sensitive towards water and aqueous alkali.

It is an object of this invention to provide a new class of unsaturated esters. A further object of this invention is to provide a new class of esters derived from unsaturated alcohols and dibasic acids. A still further object is to provide new polymers and interpolymers. Another object is to provide polymers having unique properties as coatings. An additional object is to provide new coating compositions. Other objects will appear hereinafter.

These objects are accomplished by new chemical products, the bis esters of a benzenediacetic acid with a monohydric alcohol having an ethylenic double bond in the alpha, beta position with respect to the carbinol carbon, polymers of these monomeric esters and coating compositions comprising these polymers. By ethylenic double bond is meant the usual double bond joining two aliphatic or alicyclic carbons, that is a non-aromatic double bond.

This invention comprises the bis-(2-alkenyl) esters of the benzenediacetic acids, their polymers and interpolymers. Any benzenediacetate of an allyl-type monohydric alcohol, that is an alcohol containing the 2-alkene-1-ol grouping,

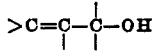

can be employed in this invention. It is pre-

2 ferred to use esters of primary or secondary allyl-type alcohols having not more than nine carbon atoms since such esters not only are more available but are in general more readily polymerizable than other esters of this new class. Especially preferred are the esters of primary allyl-type alcohols of not more than six carbon atoms and having a terminal methylene group, for example esters of allyl alcohol, methallyl alcohol and 3-hydroxybutene-1. It has been found that the unsaturated allyl-type esters of benzenediacetic acid, particularly of meta- and para-benzenediacetic acid, are unique in that their polymers provide coatings which are pliable and at the same time are highly resistant to moisture and aqueous alkali or strong soap solution.

The unsaturated esters of the benzene diacetic acids of this invention can be prepared by any of the usual methods employed for preparation of esters. For example, the diallyl benzenediacetates are readily prepared by the reaction of allyl alcohol and a benzenediacetic acid in the presence of an acid esterification catalyst, such as sulfuric acid, sodium acid sulfate or a sulfonic acid. This method is applicable to any ester of this class prepared from an unsaturated alcohol stable towards mineral acid. Certain allyl-type alcohols, such as methallyl and crotyl alcohols, are not stable in acid media, and their esters are preferably prepared from a benzenediacetate of a more volatile alcohol by ester interchange. Other methods of ester formation are also applicable to produce the new monomeric products of this invention, as for example, the reaction of a metal salt of a benzenediacetic acid with allyl bromide or allyl chloride.

These new allyl-type esters can be polymerized to yield products having useful properties. These polymerizations are generally sluggish at low temperatures and require heating in the neighborhood of 50° to 200° C. to produce polymerization at a good rate. Polymerization is generally accelerated by the addition of a catalyst. The polymerization can be carried out in any desired manner, for example in bulk without added diluent, or it can be conducted in solution, in organic type solvents, or in emulsions or aqueous systems.

Under mild treatment the relatively nonviscous monomeric esters can be polymerized to yield viscous syrups consisting of soluble polymer dissolved in unchanged monomeric ester. These syrups or even the monomers themselves applied as coatings and baked at elevated temperatures yield finishes which are insoluble and infusible, tough, pliable, and resistant to hot soapy water.

Since much of the unchanged monomer in the syrup is lost by evaporation on baking the coatings, isolation of the soluble polymer and recovery of the unchanged monomer is a more economical method for the preparation of coating compositions. The polymer can then be dissolved in inexpensive hydrocarbon solvents and used for the preparation of coatings. This separation can be accomplished by pouring the syrup into a large volume of solvent, such as methanol, with which the monomeric ester is miscible but from which the polymeric material precipitates. The separation is often more conveniently effected by distillation of the unchanged monomer at reduced pressures. By these and other conventional methods of separation, the soluble polymer can be freed of the unchanged monomer which can then again be submitted to polymerization to produce further quantities of the soluble resin.

As herein described the monomeric unsaturated benzenediacetates of this invention can be polymerized under mild conditions to viscous syrups consisting of polymeric ester dissolved in the monomeric ester. Upon continued heating under these conditions the mixture becomes more and more viscous until it is a soft gel. On further heating, hard, transparent masses are obtained. The articles so prepared are insoluble, infusible, are resistant to ordinary solvents and do not soften at elevated temperatures.

This invention is further illustrated by the following examples in which parts are by weight, unless otherwise specified.

*Example I*

The following materials are charged into a reaction vessel having a stirrer, a nitrogen inlet and a reflux condenser attached to a water separator so arranged that the water which separates as a lower layer in the distillate can be drawn off and the upper organic layer continuously returned to the reaction vessel: 102 parts of para-benzenediacetic acid, 152 parts of allyl alcohol, 44 parts of benzene and 1.8 part of concentrated sulfuric acid. The air in the vessel is displaced with nitrogen and the mixture refluxed. The water of esterification is removed as it is formed and the refluxing is continued until an aqueous layer is no longer formed in the distillate. Twenty parts of aqueous layer is collected. After cooling, the reaction mixture is washed with water, then with dilute sodium carbonate solution to remove the sulfuric acid, again with water and then dried over anhydrous magnesium sulfate and distilled. The diallyl para-benzenediacetate (100 parts yield) boils at 154° C. at 0.7 mm. mercury pressure, and is a colorless liquid having an index of refraction of 1.5115 at 21° C. It is insoluble in water, but miscible with alcohols, keytones, esters, aromatic hydrocarbons and ether. The ester has a saponification number of 411.5 and an iodine number of 186.0. Values calculated for $C_{16}H_{18}O_4$ are saponification number, 408; iodine number, 185.3.

*Example II*

Diallyl meta-benzenediacetate is prepared as described in Example I for its isomer. From 102 parts of meta-benzenediacetic acid is obtained 88 parts of the ester. It is a colorless liquid boiling at 140–145° C. at 0.1–0.15 mm. mercury pressure. It has an index of refraction at 21° C. of 1.5118, an iodine number of 183.8 and a saponification number of 427.5.

*Example III*

Diallyl benzenediacetates can be converted to soluble polymers by the following procedure: Ninety parts of diallyl para-benzenediacetate is heated in a vessel open to the air at 190–200° C. for 3¼ hours. There is obtained a viscous syrup consisting of soluble polymer dissolved in unchanged monomer. The syrup has a viscosity of 1.65 poises at 25° C. and is nearly colorless. The soluble polymer is isolated by distillation of the unchanged monomer under reduced pressure. The reaction vessel is equipped with a stirrer sealed for operation under vacuum, a stillhead and a downward condenser for collecting the unchanged monomer. The vessel is evacuated to 0.1 mm. of mercury pressure and the syrup heated until substantially all of the unchanged monomer has been removed. By heating the resin to a temperature not higher than 180° C. for a period of one hour, 40 parts of unchanged monomer are recovered. The residue consists of nearly colorless, soluble polymer of diallyl para-benzenediacetate. It is rather viscous at 180° C. and is an extremely viscous liquid at room temperature. It is readily soluble in aromatic hydrocarbons, ketones and esters and a solution containing 53% of the resin in xylene has a viscosity of 0.22 poise at room temperature. Forty-two per cent of the original monomer is converted to the soluble polymer.

Under similar conditions diallyl meta-benzenediacetate is converted to a syrup having a viscosity of 1.4 poises by heating at 190–200° C. for three hours. Upon distillation, unchanged monomer is recovered and the weight of soluble polymer isolated corresponds to 36% of the original charge. The polymer of the meta-ester is similar in properties to the polymer of the para-ester. A 42.5% solution in xylene has a viscosity of 0.005 poise at 25° C.

The solution of polymer prepared as described in Example III can be sprayed, brushed or otherwise applied to metal or other surfaces and baked to give highly inert, durable coatings. For example, after baking films of diallyl meta- or para-benzene-diacetate on sanded steel at 200° C. for ½ hour, nearly colorless coatings are obtained which can be dented or bent without cracking or chipping and which are more resistant to 10% sodium hydroxide solution at room temperature than are analogous coatings prepared from diallyl phthalate. Moreover, the diallyl phthalate coatings are extremely brittle and crack and chip upon bending or bumping the steel.

Oxygen-yielding catalysts, such as benzoyl peroxide, are particularly suitable for use in promoting the polymerization reaction in addition to air or oxygen as described in the examples. Examples of polymerization catalysts which can be used in this invention are benzoyl peroxide, ozone, hydrogen peroxide, perbenzoic acid, peracetic acid, dibutyryl peroxide, lauroyl peroxide, succinyl peroxide, tertiary butyl hydroperoxide, di-tertiary butyl peroxide and the like. Other free radical producing materials are also suitable catalysts. For example alpha, alpha'-azobis-isobutyro-nitrile, benzalazine or acetone oxime promotes the polymerization at elevated temperatures. The catalyst concentration can be varied in the range of 0.1 to 10%, but the range of 1 to 5% is preferred.

The time required for the polymerization is largely dependent upon the conditions used and the concentration of the catalyst and may vary from a few hours to several days. Low concentrations of catalysts and lower temperatures favor low reaction rates. Subatmospheric and superatmospheric pressures can sometimes be employed to advantage.

Any benzenediacetate of a 2-alkene-1-ol can be employed in this invention, the benzenediacetic acid being responsible for the advantages over other 2-alkene-1-ol esters. Examples of benzenediacetates which fall within the scope of this invention include among others those derived from ortho-meta- or para-benzenediacetic acid and any of the following unsaturated alcohols: crotyl alcohol, methallyl alcohol, tiglyl alcohol, chloro-2-butene-2-ol-1, 3-hydroxybutene-1, cinnamyl alcohol, hydroxy-1-methyl-2-hexene-2, 1,1-dimethylallyl alcohol, furfuryl alcohol, 1-hydroxymethylcyclohexene and the like.

This invention provides a new class of unsaturated esters, the polymers of which are valuable as coating compositions and for the preparation of cast articles. These new polymers have many advantages over previously known poly-unsaturated ester polymers. The esters, either in the partially polymerized syrup form or as substantially monomer free soluble polymers as described in the examples, are useful in various types of coating compositions. Both with, and without, added cobalt or other driers these esters can be set up to yield hard, light-colored films which are exceptionally tough and pliable and at the same time are unusually resistant to alkali or strong soap solution. The use of the partially polymerized esters in coating compositions is to be preferred over the use of the monomers themselves in that the viscosity and surface tension characteristics of the partial polymers are much more suitable for use in the production of films.

While extremely useful coatings are obtained from these esters and their polymers, it is sometimes desirable to add other materials as modifying agents. Satisfactory enamels can be prepared by incorporating pigments with the esters, particularly in the pure bodied form. In preference to using the pure bodied ester by itself, it is sometimes desirable to polymerize mixtures of two or more of these esters or one of these esters and another unsaturated alcohol ester of a polycarboxylic acid. These esters are also suitable for use in interpolymerizing with other polymerizable compounds, such as vinyl esters, acrylic or methacrylic esters, butadiene, styrene and the like, to form useful products for coating, molding or other plastic applications.

In addition to useful coating compositions the esters can be polymerized in bulk to cast articles, such as plates, rods, or cylinders which are hard and inert. The soluble, monomer-free polymers can be molded and polymerized with heat and catalyst to the infusible, insoluble state. Porous or fibrous materials, such as paper, cotton or rayon fabric, glass wool or glass cloth, and the like, can be impregnated with the monomers or the soluble polymers containing polymerization catalysts and, when laminated and heated, give rigid sheets resistant to heat, solvents and chemical attack.

As many apparently widely different embodiments of this invention may be made without departing from the spirit and scope thereof, it is to be understood that I do not limit myself to the specific embodiments thereof except as defined in the appended claims.

I claim:

1. A bis ester of a benzenediacetic acid with a monohydric alcohol, containing not more than nine carbon atoms and having an ethylenic double band in alpha, beta position with respect to the carbinol carbon, said alcohol being selected from the group consisting of primary and secondary monohydric alcohols.

2. A bis ester of a benzenediacetic acid with a primary monohydric alcohol containing not more than nine carbon atoms and having an ethylenic double bond in the alpha, beta position with respect to the carbinol carbon.

3. A bis ester of a benzenediacetic acid with a secondary monohydric alcohol containing not more than nine carbon atoms and having an ethylenic double bond in the alpha, beta position with respect to the carbinol carbon.

4. A bis ester of a benzenediacetic acid with a primary allyl-type alcohol containing not more than six carbon atoms and having a terminal methylene group.

5. Diallyl benzenediacetate.

6. Diallyl meta-benzenediacetate.

7. Diallyl para-benzenediacetate.

8. A polymer of a bis ester of a benzenediacetic acid with a monohydric alcohol containing not more than nine carbon atoms and having an ethylenic double bond in the alpha, beta position with respect to the carbinol carbon, said alcohol being selected from the group consisting of primary and secondary monohydric alcohols.

9. A polymer of a bis ester of a benzenediacetic acid with a primary monohydric alcohol containing not more than nine carbon atoms and having an ethylenic double bond in the alpha, beta position with respect to the carbinol carbon.

10. A polymer of a bis ester of a benzenediacetic acid with a secondary monohydric alcohol containing not more than nine carbon atoms and having an ethylenic double bond in the alpha, beta position with respect to the carbinol carbon.

11. A polymer of a bis ester of a benzenediacetic acid with a primary allyl-type alcohol containing not more than six carbon atoms and having a terminal methylene carbon.

12. A polymer of diallyl benzenediacetate.

13. A polymer of diallyl meta-benzenediacetate.

14. A polymer of diallyl para-benzenediacetate.

15. A coating composition containing, as the major film forming constituent, a polymerized diallyl benzenediacetate.

16. A coating composition containing, as the major film-forming constituent, polymerized diallyl meta-benzenediacetate.

17. A coating composition containing, as the major film-forming constituent, polymerized diallyl para-benzenediacetate.

18. A coating composition containing as the major film-forming constituent, a polymerized bis ester of a benzenediacetic acid with a monohydric alcohol containing not more than nine carbon atoms and having an ethylenic double bond in the alpha, beta-position with respect to the carbinol carbon, said alcohol being selected from the group consisting of primary and secondary monohydric alcohols.

19. A coating composition containing, as the major film-forming constituent, a polymerized bis ester of a benzenediacetic acid with a primary, allyl-type alcohol containing not more than six carbon atoms and having a terminal methylene group.

HENRY C. MILLER.

No references cited.